(12) United States Patent
Gnagey et al.

(10) Patent No.: US 12,528,672 B2
(45) Date of Patent: Jan. 20, 2026

(54) DETECTION OF A RIGGING INSTALLATION STATE

(71) Applicant: Caterpillar Inc., Peoria, IL (US)

(72) Inventors: Aaron J. Gnagey, Morton, IL (US); Daniel W. Hoyt, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 273 days.

(21) Appl. No.: 18/343,053

(22) Filed: Jun. 28, 2023

(65) Prior Publication Data
US 2025/0002302 A1 Jan. 2, 2025

(51) Int. Cl.
*B66C 13/18* (2006.01)
*B66C 23/44* (2006.01)

(52) U.S. Cl.
CPC ............. *B66C 13/18* (2013.01); *B66C 23/44* (2013.01)

(58) Field of Classification Search
CPC ................................ B66C 13/18; B66C 23/44
USPC .......................................................... 701/50
See application file for complete search history.

(56) References Cited

U.S. PATENT DOCUMENTS

| | | | |
|---|---|---|---|
| 7,006,920 B2 * | 2/2006 | Newman | E21B 41/00 702/6 |
| 10,782,202 B2 | 9/2020 | Bonnet et al. | |
| 11,142,435 B2 | 10/2021 | Hofmeister et al. | |
| 2003/0127409 A1 | 7/2003 | Verchere | |
| 2020/0140239 A1 * | 5/2020 | Schoonmaker | G01S 17/06 |
| 2021/0094803 A1 * | 4/2021 | Caldwell | B66C 23/76 |
| 2021/0101788 A1 * | 4/2021 | Caldwell | B66C 13/16 |
| 2021/0300733 A1 | 9/2021 | Gevaudant et al. | |
| 2024/0125224 A1 * | 4/2024 | Haworth | E21B 44/00 |

* cited by examiner

*Primary Examiner* — Kenneth M Dunne

(57) ABSTRACT

In some implementations, a controller may obtain sensor data indicating positional information of a movable component of a machine. The controller may determine, based on the sensor data, an installation state associated with a rigging system of the machine. The controller may perform, based on the installation state, an action associated with the machine.

20 Claims, 5 Drawing Sheets

DETECTION OF A RIGGING INSTALLATION STATE

TECHNICAL FIELD

The present disclosure relates generally to a machine having a rigging system and, for example, to the detection of a rigging installation state.

BACKGROUND

A pipelayer is a machine that is used for installing large, heavy pipeline segments into and/or above ground. The pipelayer machine may include a rigging system associated with lifting and/or placing a load. The rigging system may include a boom. The boom may extend a distance away from the machine. In some cases, the rigging system and/or the boom may need to be uninstalled. For example, the rigging system and/or the boom may be uninstalled for storage, transportation, and/or to move in areas with limited clearance, among other examples. Uninstalling the rigging system and/or the boom may include moving, disconnecting, and/or otherwise uninstalling one or more systems or components associated with the rigging system and/or the boom. In some cases, the one or more systems or components may provide data to a controller of the pipelayer machine. Additionally, the one or more systems or components may include one or more sensors configured to perform measurements associated with an operation of the pipelayer machine.

Uninstalling and re-installing the rigging system and/or the boom may change conditions or factors associated with a performance of the one or more sensors. Therefore, after the rigging system and/or the boom has been re-installed, the one or more sensors may need to be calibrated to ensure accurate readings or measurements by the one or more sensors. However, in some cases, an operator may not cause the calibration of the one or more sensors to be performed (e.g., the operator may forget to perform the calibration and/or may choose to not perform the calibration). As a result, the reliability and/or accuracy of the measurements performed by the one or more sensors may be degraded. Additionally, the one or more systems or components may continue to provide data to the controller when the rigging system and/or the boom is uninstalled. The data provided when the rigging system and/or the boom is uninstalled may be misleading and/or not useful. However, the controller may not know that the rigging system and/or the boom is uninstalled. Therefore, the controller may continue to perform operations based on the data (e.g., even though the data may be misleading and/or not useful). This may result in the controller consuming resources (e.g., processing resources, computing resources, and/or memory resources) associated with performing the operations using misleading and/or not useful data. Additionally, this may result in the controller performing an operation that is not accurate, such as causing an inaccurate notification to be provided to an operator (e.g., a notification associated with an operation of the rigging system and/or the boom when the rigging system and/or the boom is uninstalled).

The controller of the present disclosure solves one or more of the problems set forth above and/or other problems in the art.

SUMMARY

A controller for a pipelayer machine may include one or more memories, and one or more processors configured to: obtain, via a first one or more sensors, sensor data indicating positional information of a movable component of the pipelayer machine; detect, based on the sensor data, a change of an installation state associated with a rigging system of the pipelayer machine; and perform, based on detecting the change of the installation state, an action associated with the pipelayer machine.

A machine may include a rigging system including a boom; a movable component; one or more sensors coupled to the movable component; and a controller, configured to: obtain, via the one or more sensors, first sensor data indicating a first position of the movable component; determine, based on the first position of the movable component, an installation state, from an uninstalled state and an installed state, of the rigging system; and perform, based on the installation state, an action.

A method may include obtaining, by a controller of a pipelayer machine, sensor data indicating positional information of a movable component of the pipelayer machine; determining, by the controller and based on the sensor data, an installation state associated with a rigging system of the pipelayer machine; and performing, by the controller and based on the installation state, an action associated with the pipelayer machine.

DETAILED DESCRIPTION

This disclosure relates to a controller, which is applicable to any machine that includes a rigging system or another system or component that is capable of being installed or uninstalled from the machine. For example, the machine may be a pipelayer machine, a crane, a forklift, a boat, a vehicle, a compactor machine, a paving machine, a cold planer, a grading machine, a backhoe loader, a wheel loader, a harvester, an excavator, a motor grader, a skid steer loader, a tractor, and/or a dozer, among other examples.

Figure 1:
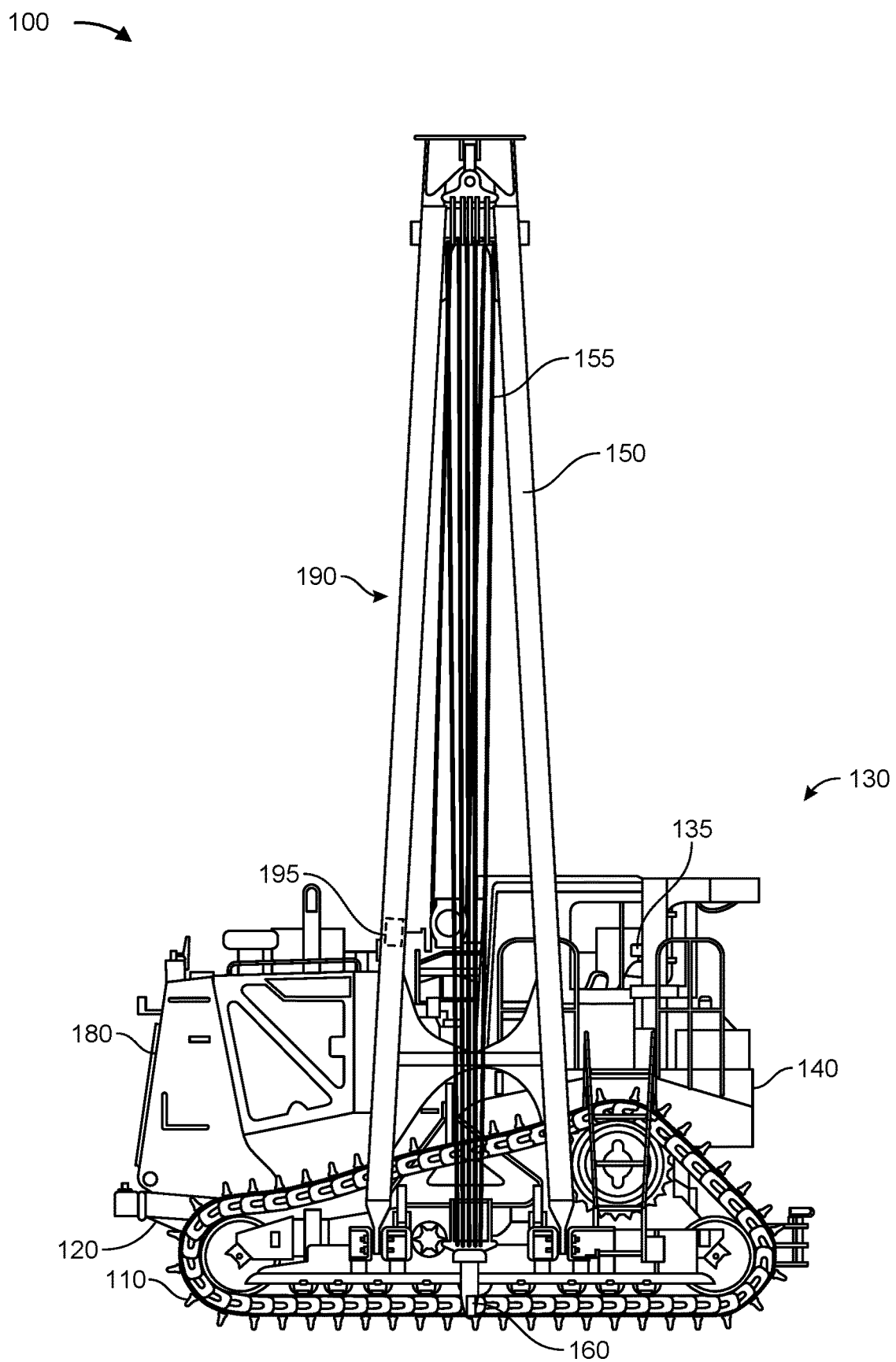
FIG. 1 is a diagram of a side view of an example machine described herein.

FIG. 1 is a diagram of a side view of an example machine 100 described herein. As shown in FIG. 1, the machine 100 is embodied as a pipelayer machine. While FIG. 1 illustrates a pipelayer machine, the present disclosure may be applicable to another type of machine with a lifting assembly or a rigging system, as described in more detail elsewhere herein.

Figure 2:
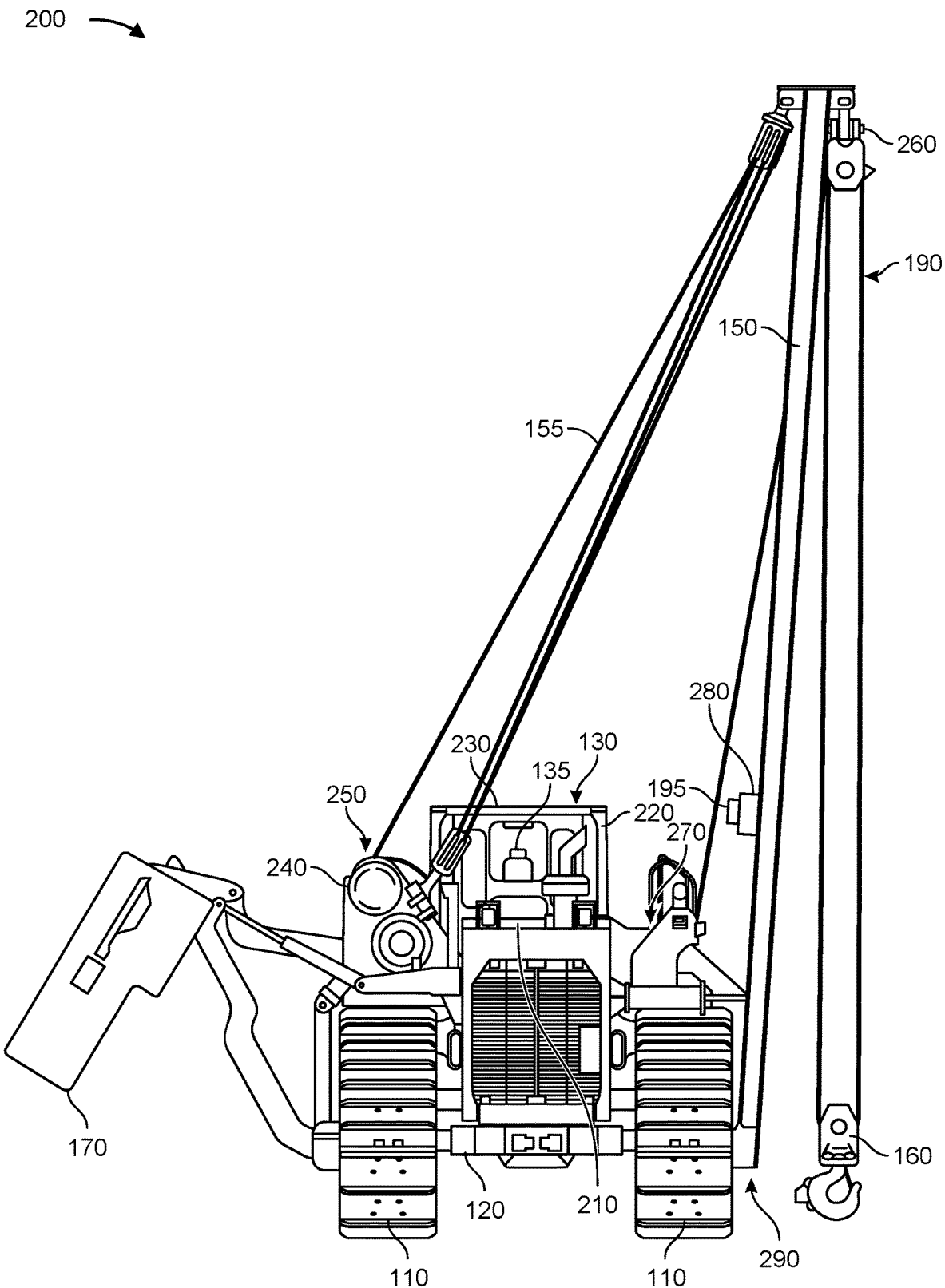
FIG. 2 is a diagram of a front view of the machine.

As shown in FIG. 1, the machine 100 includes ground engaging members 110, a machine chassis 120, an operator cabin 130, a power source 140, a boom 150, a hook component 160, a counterweight assembly 170 (shown in FIG. 2). The ground engaging members 110 include tracks that are composed of a series of interlinked track shoes in an oval track and/or high drive configuration. Alternatively, the ground engaging members 110 may include wheels, rollers, tires, and/or tracks, among other examples.

The machine chassis 120 may be provided between the ground engaging members 110 (between referring to the widthwise direction of the machine 100 relative to forward and backward travel). In some implementations, the machine 100 may be configured such that a location of a center of gravity of the machine 100 is lower than a location of a center of gravity of existing pipelayer machines. The machine chassis 120 may be configured to support the operator cabin 130 and the power source 140. The operator cabin 130 may include an integrated display (not shown) and operator controls (not shown), such as, for example, integrated joysticks. Operator controls may include one or more input components to generate signals to control movement of the machine 100 (e.g., to control a movement of the ground engaging members 110, the boom 150, and/or the hook component 160, among other components of machine 100).

The operator cabin 130 may further include a seat assembly 135. The seat assembly 135 may be configured to face a front portion of the machine 100. The operator cabin 130 may be configured to be stationary with respect to the machine chassis 120 and the ground engaging members 110.

The power source 140 may include an engine and/or a motor. As an example, the power source 140 may include an internal combustion engine. Additionally, or alternatively, the power source 140 may include an electric motor, a battery, and/or a fuel cell, among other examples. As shown in FIG. 1, the power source 140 may be provided in a rear portion of the machine 100. For example, the power source 140 may be provided adjacent to a rear surface (not shown) of the operator cabin 130.

The boom 150 may be supported by the machine chassis 120. The boom 150 may be configured to extend to a particular height at a particular angle from the machine 100 (e.g., during a lifting operation performed by the machine 100). As shown in FIG. 1, the boom 150 may be provided adjacent to a first lateral surface of the operator cabin 130 and forward with respect to the seat assembly 135. One or more lifting cables 155 may extend from a body of the machine 100 to the hook component 160 via the boom 150 to assist in lifting and/or placing a load. The hook component 160 may include a cradle and/or other mechanism for securing, carrying, holding, lifting, and/or placing a pipeline segment. The hook component 160 may be configured to secure or move the load.

The machine 100 may include a rigging system 190. The rigging system 190 includes one or more components used to lift, move, and/or support a load. For example, the rigging system 190 may include the boom 150, the hook component 160, and/or the counterweight assembly 170, among other examples. The machine 100 may include one or more sensors 195. The one or more sensors 195 may be configured to detect positional information associated with a movable component or system of the machine 100. As used herein, "movable component" may refer to a component or system that moves to different orientations and/or positions for an uninstalled state as compared to an installed state of the rigging system 190. For example, the one or more sensors 195 may be configured to detect a position and/or an orientation of a component or system of the machine 100. A sensor 195 may be an accelerometer, a gyroscope, a magnetometer, an angle sensor (e.g., a sensor configured to detect an angle of a component), an inertial measurement unit, a tilt sensor, and/or an inclinometer, among other examples. As an example, the one or more sensors 195 are shown in FIG. 1 as being configured on the boom 150. In other examples, the one or more sensors 195 may be configured on a different component or system of the machine 100.

As indicated above, FIG. 1 is provided as an example. Other examples may differ from what is described with regard to FIG. 1.

FIG. 2 is a diagram of a front view of the machine 100. Some elements of the machine 100 have been described above in connection with FIG. 1. As shown in FIG. 2, the operator cabin 130 may include a front surface 210, a first lateral surface 220, and a second lateral surface 230 opposite the first lateral surface 220.

The machine 100 may include a winch 240, a winch tower 250, a pulley 260, and a fairlead tower 270. The winch 240, the winch tower 250, the pulley 260, and/or the fairlead tower 270 may be associated with the boom 150 and the hook component 160. The winch 240, the winch tower 250, the pulley 260, and/or the fairlead tower 270 may be included in the rigging system 190. For example, the winch 240, the winch tower 250, the pulley 260, and/or the fairlead tower 270 may be used during a lifting operation that involves the boom 150 and the hook component 160. For example, the one or more lifting cables 155 may extend from the winch 240 through the pulley 260 to the hook component 160 via the boom 150 in order to assist in lifting, securing, and/or placing a load.

The machine 100 may include a load measurement system 280. The load measurement system 280 may be configured to measure a load placed on the rigging system 190 and/or on the boom 150. For example, the load measurement system 280 may be configured on the boom 150 when the rigging system 190 is in an installed state (e.g., as shown in FIG. 2). The load measurement system 280 may provide data to a controller (not shown in FIG. 2) of the machine 100. For example, the load measurement system 280 may provide an indication of load measurements to the controller.

As shown in FIG. 2, the one or more sensors 195 may be configured on the load measurement system 280. For example, the one or more sensors 195 may be configured to measure or sense positional information of the load measurement system 280. For example, as described elsewhere herein, the load measurement system 280 may be removed from the boom 150 and placed in a storage orientation when the rigging system 190 is uninstalled from the machine 100. Therefore, the position, the relative motion (e.g., relative to one or more other components of the machine 100, such as the boom 150), and/or orientation of the load measurement system 280 is indicative of the installation state of the rigging system 190. The one or more sensors 195 may be configured on (e.g., may be configured to measure or sense positional information of) any component or system of the machine 100 where the orientation or position of the component or the system changes between an installed state of the rigging system 190 and an uninstalled state of the rigging system 190 (e.g., such that the position and/or orientation of the component or the system is indicative of the installation state of the rigging system 190). For example, the one or more sensors may be configured on (e.g., may be configured to measure or sense positional information of) the hook component 160, the pulley 260, the one or more lifting cables 155, the winch tower 250, a linkage of the machine 100 (e.g., between the boom 150 and the machine chassis 120), a pin assembly 290 (e.g., associated with securing the boom 150 to the machine chassis 120), and/or a hoist winch assembly (e.g., the winch 240 and/or the winch tower 250), among other examples.

As indicated above, FIG. 2 is provided as an example. Other examples may differ from what was described with regard to FIG. 2.

Figure 3:
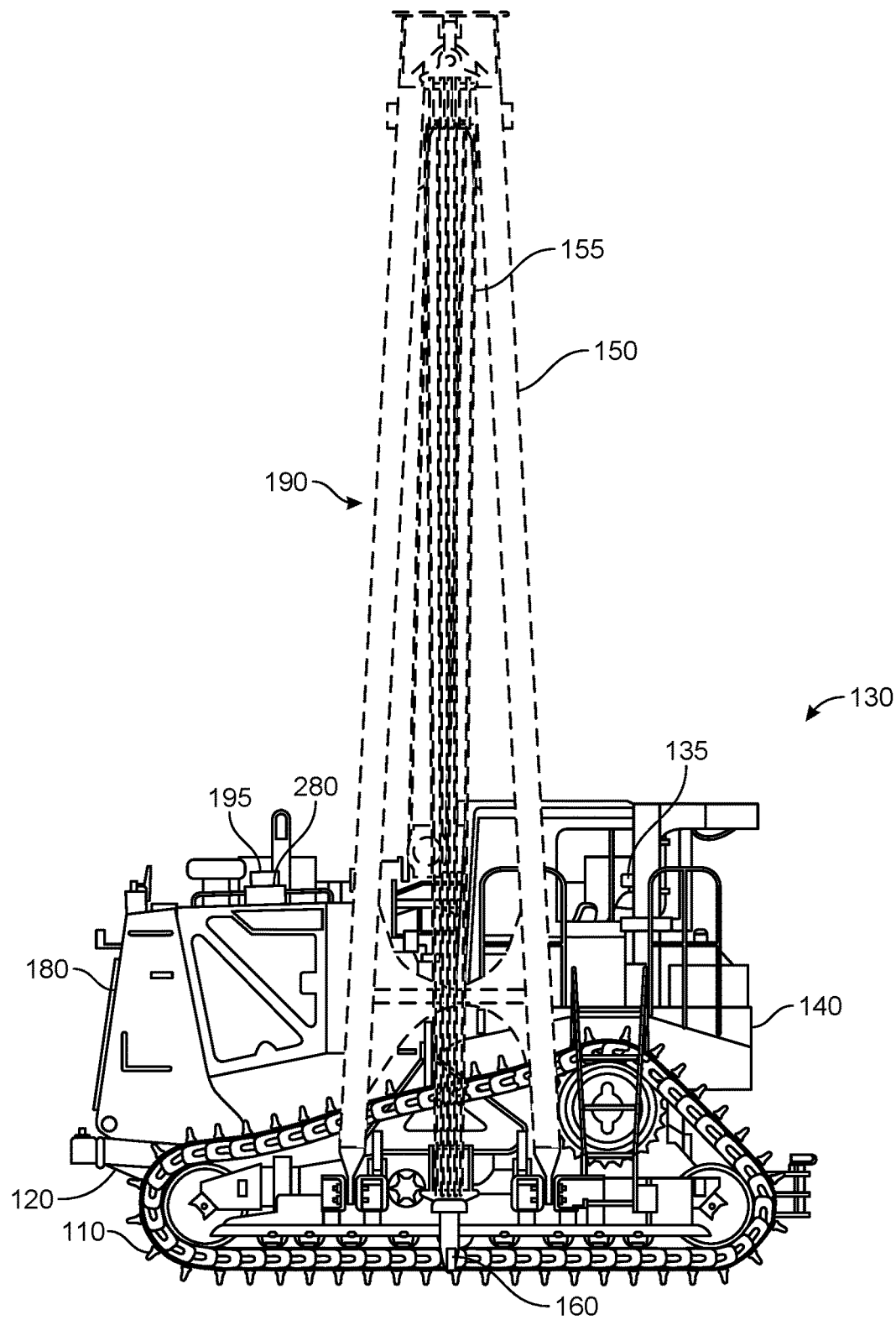
FIG. 3 is a diagram of a side view of the machine with the rigging system in an uninstalled state.

FIG. 3 is a diagram of a side view of the machine 100 with the rigging system 190 in an uninstalled state 300. For example, the dashed lines in FIG. 3 indicate components or systems that may be removed from (e.g., uninstalled from) the machine 100 when the rigging system 190 in the uninstalled state. FIGS. 1 and 2 depict the machine 100 when the rigging system 190 is in the installed state.

One or more (or all) components of the rigging system 190 may be removed from the machine 100 in the uninstalled state. For example, the boom 150 and/or the one or more lifting cables 155 may be removed from the machine 100 and/or stored in a different location on the machine 100 (e.g., for storage or transportation). Additionally, or alternatively, the winch 240, the winch tower 250, the pulley 260, and/or the fairlead tower 270 may be removed from the machine 100 and/or stored in a different location on the machine 100 when the rigging system 190 is in the uninstalled state.

As described elsewhere herein, the one or more sensors 195 may be configured on (e.g., may be configured to measure or sense positional information of) a movable component of the machine 100. The movable component may move (e.g., may be in a different position and/or orientation) when the rigging system 190 is in the installed state as compared to when the rigging system 190 is in the uninstalled state. As another example, the movable component may have a different range of motion or direction of motion (e.g., relative motion to another component of the machine 100) when the rigging system 190 is in the installed state as compared to when the rigging system 190 is in the uninstalled state. For example, as shown in FIG. 3, the movable component may be the load measurement system 280. For example, when the rigging system 190 is in the installed state, the load measurement system 280 may be configured on the boom 150 (e.g., as depicted in FIG. 2). When the rigging system 190 is in the uninstalled state, the load measurement system 280 may be removed from the boom 150 and placed in a storage location (e.g., where the storage location is the location of the load measurement system 280 as depicted in FIG. 3, as compared to an operational location of the load measurement system 280 as depicted in FIG. 2). For example, the load measurement system 280 may be configured on the machine chassis 120 when the rigging system 190 is in the uninstalled state.

As an example, when the load measurement system 280 is moved because of the rigging system 190 transitioning between the installed state and the uninstalled state, one or more sensors of the load measurement system 280 (e.g., that are different than the one or more sensors 195) may need to be calibrated (or re-calibrated). For example, when the load measurement system is re-installed on the boom 150 (e.g., after being placed in the storage location), the one or more sensors of the load measurement system 280 may need to be calibrated (or re-calibrated) to ensure accurate and/or reliable load measurements performed by the load measurement system 280. The one or more sensors 195 may provide positional information to enable a controller of the machine 100 to detect when the rigging system 190 has changed installation states, thereby enabling the controller to perform operation(s) in accordance with the current installation state, such as causing the one or more sensors of the load measurement system 280 to be (re-)calibrated, among other examples.

As indicated above, FIG. 3 is provided as an example. Other examples may differ from what was described with regard to FIG. 3.

Figure 4:
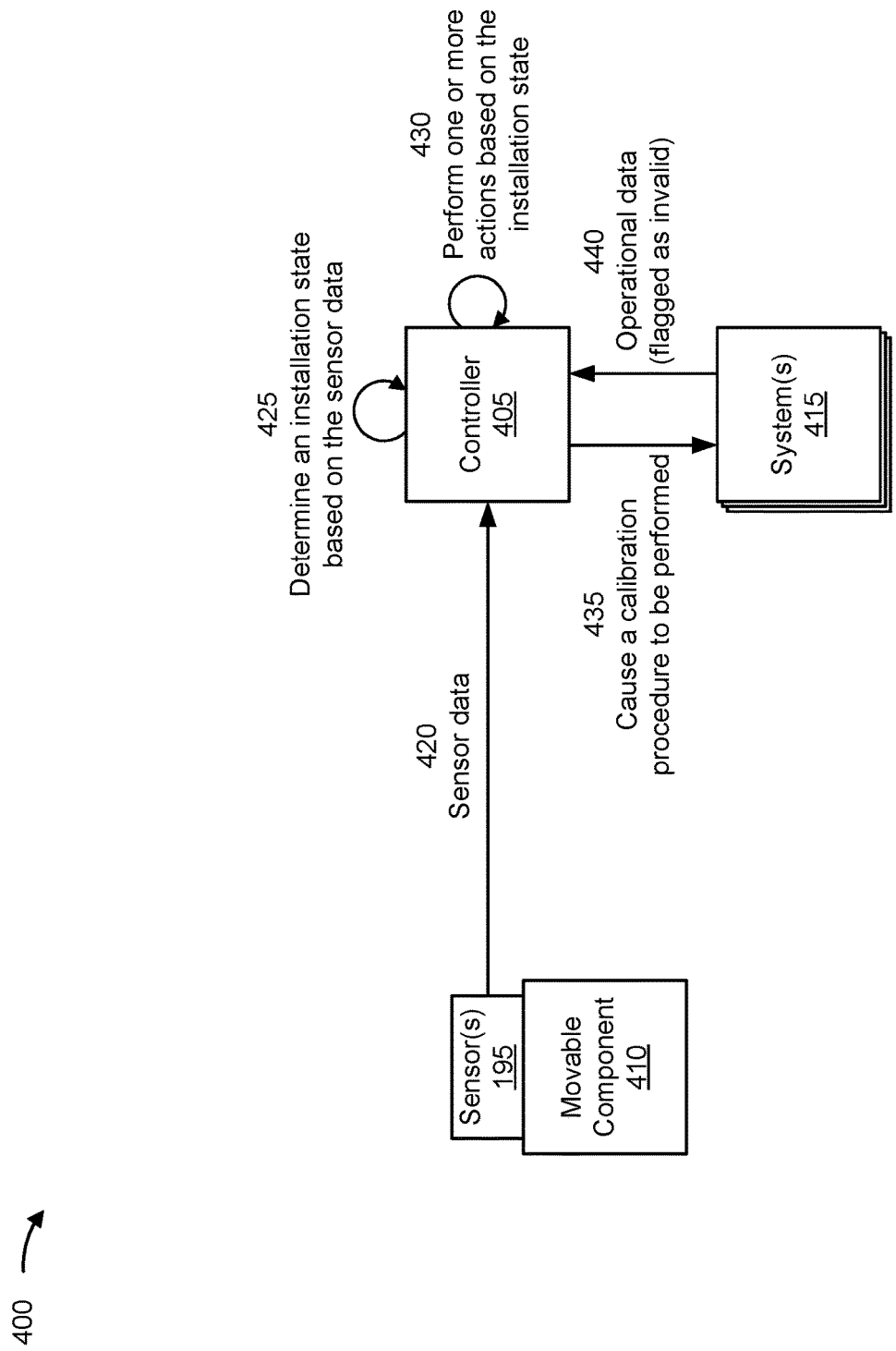
FIG. 4 is a diagram of an example associated with a detection of a rigging installation state.

FIG. 4 is a diagram of an example 400 associated with a detection of a rigging installation state. For example, the machine 100 may include a controller 405, a movable component 410, one or more systems 415, and the one or more sensors 195. The movable component 410 may be a component of the rigging system 190 or another component of the machine 100 (e.g., where a position and/or orientation of the component is indicative of the installation state of the rigging system 190).

For example, the movable component 410 may be the load measurement system 280, a sensor system of the machine 100, the boom 150, the hook component 160, the pulley 260, the one or more lifting cables 155, the winch tower 250, a linkage of the machine 100 (e.g., between the boom 150 and the machine chassis 120), a pin assembly 290 (e.g., associated with securing the boom 150 to the machine chassis 120), and/or a hoist winch assembly (e.g., the winch 240 and/or the winch tower 250), among other examples. In some implementations, the movable component 410 may include the one or more systems 415 and/or one or more sensors to be calibrated, as explained in more detail elsewhere herein.

The controller 405 may include one or more processors and one or more memories. A processor may include a central processing unit, a graphics processing unit, a microprocessor, a controller, a microcontroller, a digital signal processor, a field-programmable gate array, an application-specific integrated circuit, and/or another type of processing component. A processor may be implemented in hardware, firmware, or a combination of hardware and software. A processor may include one or more processors capable of being programmed to perform one or more operations or processes described elsewhere herein. A memory may include volatile and/or nonvolatile memory. For example, a memory may include random access memory (RAM), read only memory (ROM), a hard disk drive, and/or another type of memory (e.g., a flash memory, a magnetic memory, and/or an optical memory). A memory may include internal memory (e.g., RAM, ROM, or a hard disk drive) and/or removable memory (e.g., removable via a universal serial bus connection). A memory may be a non-transitory computer-readable medium. A memory may store information, one or more instructions, and/or software (e.g., one or more software applications) related to the operation of the controller 405. A memory may include one or more memories that are coupled (e.g., communicatively coupled) to the one or more processors, such as via a bus. Communicative coupling between a processor and a memory may enable the processor to read and/or process information stored in the memory and/or to store information in the memory.

The controller 405 may perform one or more operations or processes described herein. For example, a non-transitory computer-readable medium (e.g., memory) may store a set of instructions (e.g., one or more instructions or code) for execution by the processor. The processor may execute the set of instructions to perform one or more operations or processes described herein. In some implementations, execution of the set of instructions, by one or more processors, causes the one or more processors and/or the controller 405 to perform one or more operations or processes described herein. Hardwired circuitry may be used instead of or in combination with the instructions to perform one or more operations or processes described herein.

The one or more systems 415 may include systems that perform operations associated with the machine 100. For example, the one or more systems 415 may perform operation(s) that are impacted by (e.g., that perform differently and/or obtain different data depending on) the installation state of the rigging system 190. For example, the one or more systems 415 may include the load measurement system 280, a control system of the machine 100, a movement control system (e.g., associated with controlling and/or restricting a movement of one or more components of the machine 100), a lift control system (e.g., associated with controlling a lift operation of the machine 100), and/or any system that includes a sensor, among other examples.

As shown by reference number 420, the controller 405 may obtain sensor data. The controller 405 may obtain the sensor data via the one or more sensors 195. The sensor data may indicate positional information of the movable component 410 of the machine 100. For example, the positional information may indicate a position, a direction of movement, a speed, and/or an orientation of the movable component 410, among other examples. For example, the sensor data may indicate a position of the movable component 410.

As shown by reference number 425, the controller 405 may determine an installation state of the rigging system 190. The controller 405 may determine the installation state based on the sensor data. For example, the controller 405 may determine the installation state based on the positional information associated with the movable component 410. For example, if the movable component 410 is in a first position, a first orientation, and/or has a first direction of movement, then the controller 405 may determine that the installation state is the installed state (e.g., as depicted in FIGS. 1 and 2). If the movable component 410 is in a second position, a second orientation, and/or has a second direction of movement, then the controller 405 may determine that the installation state is the uninstalled state (e.g., as depicted in FIG. 3).

For example, when the rigging system 190 is in the installed state, the movable component 410 may be in a first position and/or have a first range of motion (e.g., associated with an operation of the rigging system 190. When the rigging system 190 is in the uninstalled state, the movable component 410 may be in a second position and/or have no motion relative to the machine 100 and/or relative to the machine chassis 120 (e.g., associated with the rigging system 190 being uninstalled and/or stored). Therefore, the controller 405 may be configured to detect and/or determine the installation state of the rigging system 190 by monitoring the sensor data indicating positional information of the movable component 410.

For example, the movable component 410 may be associated with a range of motion during the installed state. The range of motion may be relative to the machine 100 and/or the machine chassis 120. As an example, the movable component 410 may be the boom 150 and/or a component or system coupled to the boom 150 (e.g., the load measurement system 280). When the machine 100 is operational and the rigging system is in the installed state, the boom 150 may be configured to move (e.g., within the range of motion) to perform lift operations associated with the machine 100. When the rigging system 190 is in the uninstalled state, the boom 150 may be removed from the machine 100 and placed in a different position or location (e.g., outside of the range of motion). Therefore, the controller 405 may use the range of motion as a factor for determining the installation state of the rigging system 190. For example, the controller 405 may determine whether the sensor data indicates that the position of the movable component 410 is within the range of motion. If the sensor data indicates that the position of the movable component 410 is within the range of motion, then the controller 405 may determine that the installation state is the installed state. If the sensor data indicates that the position of the movable component 410 is not within the range of motion, then the controller 405 may determine that the installation state is the uninstalled state.

In some implementations, the controller 405 may obtain one or more additional inputs associated with determining the installation state. The one or more additional inputs may improve the determination of the installation state. For example, depending on which component or system of the machine 100 is the movable component 410, using the positional information alone may result in inaccurate determinations of the installation state in some cases. For example, the movable component 410 may be removed from the machine 100 (e.g., in the uninstalled state), but may be in the same, or a similar, position or orientation that is associated with the installed state (e.g., even though the movable component 410 is removed or uninstalled from the machine 100). In such examples, using the positional information alone, the controller 405 may incorrectly determine that the rigging system 190 is in the installed state.

The one or more additional inputs may provide information to enable the controller 405 to improve the determination of the installation state. For example, the one or more additional inputs may include an input response indicative of whether an operating system (e.g., a system 415 and/or a system associated with the movable component 410) is functional. For example, the input response may be in response to an operator input (e.g., via operator controls, such as integrated joysticks). As an example, the input response may indicate that the operating system has responded to and/or performed an action indicated by the operator input. In such examples, if positional information indicates that the rigging system 190 is in the installed state, then the input response may confirm that the rigging system 190 is in the installed state. As another example, the input response may indicate that the operating system has not responded to and/or cannot perform an action indicated by the operator input. In such examples, if positional information indicates that the rigging system 190 is in the installed state, then the input response may enable the controller 405 to determine that the rigging system 190 is actually in the uninstalled state. Other example additional inputs may include operational data (e.g., indicating data of operations of the machine 100), an error notification (e.g., indicating an error associated with a system 415 and/or the movable component), and/or a response from a movement control system (e.g., indicating whether components of the rigging system 190 are in allowable positions), among other examples.

In other examples, the controller 405 may reliably determine the installation state using the positional information of the movable component 410 (e.g., without using the additional input(s)). For example, the movable component 410 may have a defined or known storage location associated with the uninstalled state. As an example, the load measurement system 280 may be removed from the boom 150 and placed in a storage location on the machine chassis 120 when the rigging system 190 is uninstalled from the machine 100. Other example movable components 410 may similarly be associated with defined or known storage locations and/or orientations. Therefore, the controller 405 may determine the installation state based on comparing the positional information of the movable component 410 to the position and/or orientation of the storage location associated with the movable component 410. For example, if the positional information indicates that the movable component 410 is in the storage location, then the controller 405 may determine that the installation state is the uninstalled state. If the positional information indicates that the movable component 410 is not in the storage location, then the controller 405 may determine that the installation state is the installed state. This may reduce a complexity associated with determining the installation state (e.g., by eliminating the need for any additional inputs to reliably and/or accurately determine the installation state).

In some implementations, the controller 405 may detect, based on the sensor data, a change of an installation state associated with the rigging system 190. For example, the controller 405 may detect the change of the installation state based on a change in position or orientation of the movable component 410, indicated by the sensor data, being associated with the change of the installation state. For example, the controller 405 may detect a change from the uninstalled state to the installed state. As another example, the controller 405 may detect a change from the installed state to the uninstalled state.

As shown by reference number 430, the controller 405 may perform one or more actions based on the determined or detected installation state. In other words, the controller 405 may control one or more operations of the machine 100 based on, or in response to, the determined or detected installation state (e.g., the controller 405 may control one or more operations of the machine 100 differently for different installation states of the rigging system 190). For example, the controller 405 may perform the one or more actions in response to detecting a change in the installation state of the rigging system 190 (e.g., from the uninstalled state to the installed state or from the installed state to the uninstalled state).

For example, the one or more actions may include causing a notification to be indicated via a control panel of the machine 100. The notification may indicate that the one or more systems 415 and/or a second one or more sensors (e.g., that are different than the one or more sensors 195) of the machine 100 are to be calibrated. For example, the controller 405 may cause a notification to be output and/or displayed that notifies an operator of the machine 100 to perform a calibration procedure (or a re-calibration procedure). As an example, based on detecting a change from the installed state to the uninstalled state, the controller 405 may cause the notification to be output and/or displayed (e.g., because the one or more systems 415 and/or the one or more sensors may need to be calibrated once installed again). As another example, based on detecting a change from the uninstalled state to the installed state, the controller 405 may cause the notification to be output and/or displayed (e.g., because the one or more systems 415 and/or the one or more sensors may need to be calibrated because they have been re-installed). This improves a likelihood that the (re-)calibration of the one or more systems 415 and/or the one or more sensors is performed, thereby improving an accuracy of data output by the one or more systems 415 and/or the one or more sensors.

As another example, the one or more actions may include causing an operational state of the one or more systems 415 to be changed. For example, the controller 405 may cause, based on determining or detecting that the installation state is the uninstalled state, the one or more systems 415 to be placed in a non-operational state. The controller 405 may cause, based on determining or detecting that the installation state is the installed state, the one or more systems 415 to be placed in an operational state. The non-operational state may be associated with disabling the one or more systems 415 and/or marking or flagging data provided by the one or more systems 415 as invalid (e.g., as described in more detail elsewhere herein). For example, the one or more systems 415 may include a movement restriction system associated with restricting movement of one or more components of the machine 100 (e.g., to ensure that the one or more components do not collide with other components of the machine 100 or with other objects) while the machine 100 is operational. The controller 405 may, based on detecting a change from the installed state to the uninstalled state, disable one or more movement restrictions of the movable component 410 and/or another component of the machine 100. This may enable the components of the rigging system 190 to be removed from the machine 100 without triggering notifications or errors from the movement restriction system. The controller 405 may, based on detecting a change from the uninstalled state to the installed state, activate or enable the one or more movement restrictions.

As another example, the one or more actions may include enabling or disabling a use of the one or more systems 415. For example, based on detecting a change from the installed state to the uninstalled state, the controller 405 may disable or restrict a use of the one or more systems 415. Based on detecting a change from the uninstalled state to the installed state, the controller 405 may enable a use of the one or more systems 415. As another example, the controller 405 may detect that the installation state has changed from the uninstalled state to the installed state. The controller 405 may restrict, based on detecting that the installation state changed from the uninstalled state to the installed state, a use of the one or more systems 415 until the one or more systems 415 have been calibrated. For example, the controller 405 may not allow, may deny, and/or may restrict operator input(s) associated with the one or more systems 415 until the one or more systems 415 have been calibrated.

As described above, and as shown by reference number 435, the controller 405 may cause a calibration procedure to be performed that is associated with the one or more systems 415 (e.g., based on the determined or detected installation state of the rigging system 190). For example, the controller 405 may cause the calibration procedure to be performed in response to obtaining an operator input indicating that the calibration procedure is to be performed. For example, the controller 405 may cause a notification indicating a need for the calibration procedure to be performed (e.g., as described in more detail elsewhere herein). The controller 405 may obtain the operator input indicating that the calibration procedure is to be performed associated with providing the notification.

In some implementations, the controller 405 may cause (e.g., automatically without obtaining an operator input), the calibration procedure, associated with the one or more systems 415, to be performed. For example, based on detecting a change from the uninstalled state to the installed state, the controller 405 may automatically perform a (re-)calibration of the one or more systems 415 and/or sensor(s) associated with the one or more systems 415.

As shown by reference number 440, the controller 405 may obtain, from the one or more systems 415, operational data. The operational data may be data collected by the one or more systems 415 associated with an operation of the one or more systems 415 and/or an operation of the machine 100. The controller 405 may determine an applicability of the operation data based on the determined or detected installation state of the rigging system 190. For example, the controller 405 may cause, based on the change of the installation state being from an installed state to an uninstalled state, information provided by one or more systems 415 to be indicated as invalid (e.g., to be flagged as invalid or non-operational in memory associated with the controller 405). This may enable the one or more systems 415 to remain online and/or functional when the rigging system 190 is in the uninstalled state while also enabling the controller 405 to identify that data provided by the one or more systems 415 may not be valid or useful while the rigging system 190 is in the uninstalled state.

As indicated above, FIG. 4 is provided as an example. Other examples may differ from what was described with regard to FIG. 4.

Figure 5:
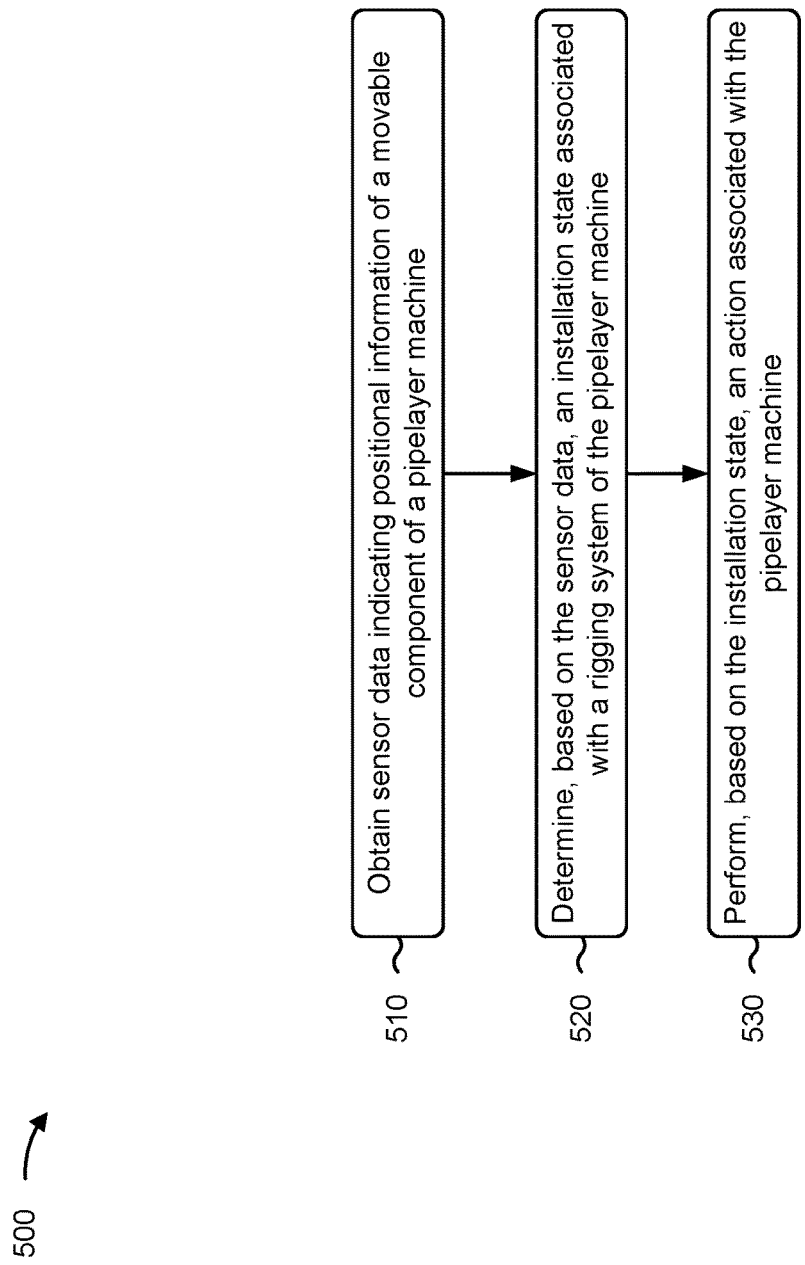
FIG. 5 is a flowchart of an example process associated with a detection of a rigging installation state.

FIG. 5 is a flowchart of an example process 500 associated with a detection of a rigging installation state. One or more process blocks of FIG. 5 may be performed by a controller (e.g., the controller 405). Additionally, or alternatively, one or more process blocks of FIG. 5 may be performed by another device or a group of devices separate from or including the controller, such as another device or component that is internal or external to the machine 100.

As shown in FIG. 5, process 500 may include obtaining sensor data indicating positional information of a movable component of the pipelayer machine (block 510). For example, the controller may obtain sensor data indicating positional information of a movable component of the pipelayer machine, as described above.

As further shown in FIG. 5, process 500 may include determining, based on the sensor data, an installation state associated with a rigging system of the pipelayer machine (block 520). For example, the controller may determine, based on the sensor data, an installation state associated with a rigging system of the pipelayer machine, as described above. Determining the installation state may include detecting that the installation state has changed from an uninstalled state to an installed state, or vice versa.

As further shown in FIG. 5, process 500 may include performing, based on the installation state, an action associated with the pipelayer machine (block 530). For example, the controller may perform, based on the installation state, an action associated with the pipelayer machine, as described above. The installation state may be an uninstalled state and performing the action may include disabling one or more movement restrictions of the movable component or another component of the pipelayer machine. As another example, performing the action may include restricting, based on detecting that the installation state changed from the uninstalled state to the installed state, a use of one or more systems of the pipelayer machine until the one or more systems have been calibrated.

Performing the action may include providing an operator notification indicating that the one or more systems are to be calibrated, and/or performing a calibration operation to calibrate the one or more systems. In some examples, the installation state may be the uninstalled state, and performing the action may include obtaining, via one or more systems of the machine 100, operational data, and causing, based on the installation state being the uninstalled state, the operational data to be flagged as invalid.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

Uninstalling and re-installing a rigging system and/or a boom of a machine (such as the machine 100) may change conditions or factors associated with a performance of the one or more sensors. Therefore, after the rigging system and/or the boom has been re-installed, the one or more sensors may need to be calibrated to ensure accurate readings or measurements by the one or more sensors. However, in some cases, an operator may not cause the calibration of the one or more sensors to be performed (e.g., the operator may forget to perform the calibration and/or may choose to not perform the calibration). As a result, the reliability and/or accuracy of the measurements performed by the one or more sensors may be degraded. Additionally, the one or more systems or components may continue to provide data to the controller when the rigging system and/or the boom is uninstalled. The data provided when the rigging system and/or the boom is uninstalled may be misleading and/or not useful. However, the controller may not know that the rigging system and/or the boom is uninstalled. Therefore, the controller may continue to perform operations based on the data (e.g., even though the data may be misleading and/or not useful).

Some implementations described herein enable automatic detection of an installation state of the rigging system (e.g., by a controller of the machine). For example, the controller may obtain sensor data indicating positional information of a component (e.g., a movable component) of the machine. The controller may determine, based on the sensor data, an installation state associated with the rigging system of the machine. The controller may perform, based on the determined installation state, an action associated with the machine. For example, the controller may control one or more operations and/or functions associated with the machine differently for different installation states of the machine 100.

As a result, the controller may be enabled to reliably determine the installation state of the rigging system using the positional information of the component. This enables the controller to perform action(s) and/or control the machine in accordance with the installation state of the rigging system. For example, the controller may perform an action to increase a likelihood that a (re-)calibration of one or more systems and/or one or more sensors of the machine is performed when the rigging system is (re-)installed on the machine. Improving the likelihood that the (re-)calibration is performed may improve a likelihood that data provided by the one or more systems and/or one or more sensors is accurate and/or reliable. As another example, the controller may cause a status of one or more systems of the machine to be changed or set based on the determined installation state of the rigging system. For example, the controller may disable one or more movement restrictions of a system based on determining that the installation state is the uninstalled state, thereby enabling the rigging system to be uninstalled without causing an alert or error to be provided by the system.

As another example, the controller may be enabled to determine an operational state of one or more systems and/or one or more sensors of the machine based on the installation state. For example, the controller may determine that a system is non-operational based on determining that the installation state is the uninstalled state. This enables the system to remain connected, powered on, and/or functional while the installation state of the rigging system is the uninstalled state, while also enabling the controller to determine that data provided by the system is inaccurate or not useful while the installation state of the rigging system is the uninstalled state. Enabling the system to remain connected, powered on, and/or functional while the installation state of the rigging system is the uninstalled state may enable the controller to obtain more insightful information associated with the system. For example, if the system were to be simply powered off and/or disconnected when the rigging system is in the uninstalled state, a reason for the disconnection may be unclear (e.g., the system could be powered off and/or disconnected because of an error or problem with the system or because the rigging system is in the uninstalled state). By enabling the system to remain connected, powered on, and/or functional while the installation state of the rigging system is the uninstalled state, the controller may obtain more useful information related to the operational status of the system.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A controller for a pipelayer machine, comprising:
one or more memories; and
one or more processors configured to:
obtain, via one or more first sensors, sensor data indicating positional information of a movable component of the pipelayer machine;
detect, based on the sensor data, a change of an installation state associated with a rigging system of the pipelayer machine; and
perform an action associated with the pipelayer machine,
wherein when the change of the installation state is from an uninstalled state to an installed state, the action comprises at least one of:
placing one or more systems in an operational state,
causing a calibration procedure, associated with the one or more systems or one or more second sensors of the pipelayer machine, to be automatically performed, or
restricting a use of the one or more systems until the one or more systems have been calibrated, or
wherein when the change of the installation state is from the installed state to the uninstalled state, the action comprises at least one of:
placing the one or more systems in a non-operational state, or
disabling or restricting the use of the one or more systems.

2. The controller of claim 1,
wherein the positional information indicates at least one of a position, relative motion, or an orientation of the movable component, and
wherein the one or more processors, to detect the change of the installation state, are configured to:
detect the change of the installation state based on a change in the position, the relative motion, or the orientation of the movable component, indicated by the sensor data, being associated with the change of the installation state.

3. The controller of claim 1,
wherein when the change of the installation state is from the uninstalled state to the installed state or from the installed state to the uninstalled state, the action further comprises:
causing a notification to be indicated via a control panel of the pipelayer machine,
wherein the notification indicates that the one or more systems or the one or more second sensors are to be calibrated.

4. The controller of claim 1,
wherein when the change of the installation state is from the uninstalled state to the installed state, the action comprises:
causing the calibration procedure to be automatically performed.

5. The controller of claim 4,
wherein the movable component includes the one or more systems or the one or more second sensors.

6. The controller of claim 1,
wherein when the change of the installation state is from the installed state to the uninstalled state, the action further comprises:
causing information provided by the one or more systems to be indicated as invalid.

7. The controller of claim 1,
wherein the movable component includes at least one of:
a sensor system,
a hoist winch assembly,
a linkage,
a pin assembly, or
a boom.

8. The controller of claim 1, wherein when the change of the installation is from the uninstalled state to the installed state, the action comprises:
placing the one or more systems in the operational state.

9. A machine, comprising:
a rigging system including a boom;
a movable component;
one or more first sensors coupled to the movable component; and
a controller, configured to:
obtain, via the one or more first sensors, first sensor data indicating a first position of the movable component;
determine, based on the first position of the movable component, an installation state of the rigging system; and
perform an action, wherein when the installation state is an installed state, the action comprises at least one of:
placing one or more systems in an operational state,
causing a calibration procedure, associated with the one or more systems or one or more second sensors of the machine, to be automatically performed, or
restricting a use of the one or more systems until the one or more systems have been calibrated, or
wherein when the installation state is an uninstalled state, the action comprises at least one of:
placing the one or more systems in a non-operational state, or
disabling or restricting the use of the one or more systems.

10. The machine of claim 9,
wherein when the installation state is the uninstalled state, the action further comprises:
placing the one or more systems in the non-operational state.

11. The machine of claim 10,
wherein the controller is further configured to:
obtain, via the one or more first sensors, second sensor data indicating a second position of the movable component;
determine, based on the second position of the movable component, that the installation state has changed to the installed state; and
at least one of:
place the one or more systems in the operational state, or
cause the calibration procedure to be automatically performed.

12. The machine of claim 9,
wherein the movable component is associated with a range of motion during the installed state, and wherein the controller, to determine the installation state, is configured to:
determine whether the first sensor data indicates that the first position of the movable component is within the range of motion.

13. The machine of claim 9,
wherein the controller is further configured to:
obtain, via an operating system of the machine, an input response indicative of whether the operating system is functional, and
wherein the controller, to determine the installation state, is configured to:
determine, based on the first position of the movable component and the input response, the installation state.

14. The machine of claim 9,
wherein the movable component comprises a load measurement system of the machine.

15. The machine of claim 9,
wherein the one or more first sensors include at least one of:
an accelerometer, or
a gyroscope.

16. A method, comprising:
obtaining, by a controller of a pipelayer machine, sensor data indicating positional information of a movable component of the pipelayer machine;
determining, by the controller and based on the sensor data, an installation state associated with a rigging system of the pipelayer machine; and
performing, by the controller and based on the installation state, an action associated with the pipelayer machine,
wherein when the installation state is an installed state, the action comprises at least one of:
placing one or more systems in an operational state,
causing a calibration procedure, associated with the one or more systems or one or more second sensors of the pipelayer machine, to be automatically performed, or
restricting a use of the one or more systems until the one or more systems have been calibrated, or
wherein when the installation state is an uninstalled state, the action comprises at least one of:
placing the one or more systems in a non-operational state, or
disabling or restricting the use of the one or more systems.

17. The method of claim 16,
wherein when the installation state is the uninstalled state, the action further comprises:
disabling one or more movement restrictions of the movable component or another component of the pipelayer machine.

18. The method of claim 16,
wherein determining the installation state comprises:
detecting that the installation state has changed from the uninstalled state to the installed state, and
wherein performing the action comprises:
restricting, based on detecting that the installation state changed from the uninstalled state to the installed state, the use of the one or more systems.

19. The method of claim 16,
wherein when the installation state is the uninstalled state, the action further comprises:
obtaining, via the one or more systems, operational data; and
causing the operational data to be flagged as invalid.

20. The method of claim 16, wherein when the installation state is the uninstalled state, the action comprises:
disabling or restricting the use of the one or more systems.

* * * * *